(12) United States Patent
Ishii et al.

(10) Patent No.: US 10,963,258 B2
(45) Date of Patent: Mar. 30, 2021

(54) APPARATUS AND METHOD FOR PERFORMING MULTIPLE CONTROL FLOW PREDICTIONS

(71) Applicant: Arm Limited, Cambridge (GB)

(72) Inventors: Yasuo Ishii, Austin, TX (US); Muhammad Umar Farooq, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 81 days.

(21) Appl. No.: 16/155,049

(22) Filed: Oct. 9, 2018

(65) Prior Publication Data

US 2020/0110611 A1    Apr. 9, 2020

(51) Int. Cl.
*G06F 9/38*    (2018.01)
*G06F 9/30*    (2018.01)

(52) U.S. Cl.
CPC ........ *G06F 9/3806* (2013.01); *G06F 9/30058* (2013.01)

(58) Field of Classification Search
None
See application file for complete search history.

(56) References Cited

U.S. PATENT DOCUMENTS

| 2016/0132331 A1* | 5/2016 | Godard | G06F 9/3806 711/137 |
| 2018/0101385 A1* | 4/2018 | Wang | G06F 9/3848 |

* cited by examiner

*Primary Examiner* — John M Lindlof
(74) *Attorney, Agent, or Firm* — Nixon & Vanderhye P.C.

(57) ABSTRACT

A data processing apparatus is provided that includes lookup circuitry to provide first prediction data in respect of a first block of instructions and second prediction data in respect of a second block of instructions. First processing circuitry provides a first control flow prediction in respect of the first block of instructions using the first prediction data and second processing circuitry provides a second control flow prediction in respect of the second block of instructions using the second prediction data. The first block of instructions and the second block of instructions collectively define a prediction block and the lookup circuitry uses a reference to the prediction block as at least part of an index to both the first prediction data and the second prediction data.

16 Claims, 7 Drawing Sheets

APPARATUS AND METHOD FOR PERFORMING MULTIPLE CONTROL FLOW PREDICTIONS

TECHNICAL FIELD

The present disclosure relates to data processing. More particularly, it relates to control flow prediction.

DESCRIPTION

Control flow prediction (such as branch prediction) is a technique that is used to continue the execution of instructions in a pipeline when the flow of a program might change. When a control flow instruction (such as a branch instruction) is encountered, it is not immediately known which direction the program will go. However, it is undesirable to simply stop execution until the control flow instruction can be evaluated. Control flow prediction makes it possible to predict (e.g. based on previous behaviour) the direction that a control flow instruction will take and instructions can be executed in that direction until the branch is evaluated.

Control flow prediction operates on a block of instructions at a time. In order to achieve high bandwidth, it is possible to increase the size of the blocks on which control flow prediction occurs. However, inefficiencies can arise with certain program structures such as when loops span multiple blocks. Another option could be to increase the number of input ports. However, this increases the amount of hardware, which in turn leads to increased circuit size and increased power consumption, which can be undesirable.

SUMMARY

Viewed from a first example configuration, there is provided a data processing apparatus comprising: lookup circuitry to provide first prediction data in respect of a first block of instructions and second prediction data in respect of a second block of instructions; first processing circuitry to provide a first control flow prediction in respect of the first block of instructions using the first prediction data; and second processing circuitry to provide a second control flow prediction in respect of the second block of instructions using the second prediction data, wherein the first block of instructions and the second block of instructions collectively define a prediction block; and the lookup circuitry uses a reference to the prediction block as at least part of an index to both the first prediction data and the second prediction data.

Viewed from a second example configuration, there is provided a method comprising: providing first prediction data in respect of a first block of instructions and second prediction data in respect of a second block of instructions; providing a first control flow prediction in respect of the first block of instructions using the first prediction data; and providing a second control flow prediction in respect of the second block of instructions using the second prediction data, wherein the first block of instructions and the second block of instructions collectively define a prediction block; and a reference to the prediction block is used as at least part of an index to both the first prediction data and the second prediction data Viewed from a third example configuration, there is provided a data processing apparatus comprising: means for providing first prediction data in respect of a first block of instructions and second prediction data in respect of a second block of instructions; means for providing a first control flow prediction in respect of the first block of instructions using the first prediction data; and means for providing a second control flow prediction in respect of the second block of instructions using the second prediction data, wherein the first block of instructions and the second block of instructions collectively define a prediction block; and a reference to the prediction block is used as at least part of an index to both the first prediction data and the second prediction data.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with a first aspect there is provided a data processing apparatus comprising: lookup circuitry to provide first prediction data in respect of a first block of instructions and second prediction data in respect of a second block of instructions; first processing circuitry to provide a first control flow prediction in respect of the first block of instructions using the first prediction data; and second processing circuitry to provide a second control flow prediction in respect of the second block of instructions using the second prediction data, wherein the first block of instructions and the second block of instructions collectively define a prediction block; and the lookup circuitry uses a reference to the prediction block as at least part of an index to both the first prediction data and the second prediction data.

The lookup circuitry receives one reference to a prediction block that is made up from a first block of instructions and a second block of instructions. The lookup circuitry consequently provides prediction data for the first block of instructions and the second block of instructions that make up the prediction block and these are in turn used by the first and second processing circuitry to provide a first control flow prediction and a second control flow prediction for the first and second blocks of instructions, respectively. Although two sets of prediction data are provided, the number of lookups is not doubled because the lookup circuitry uses the reference to the prediction block as an index, as opposed to references to the first and second blocks. This therefore obviates the need for the lookup circuitry to be significantly increased in size in order to handle multiple blocks of instructions. Meanwhile, since the two instruction blocks are handled individually rather than as a single large block, it is possible to remain flexible and thus avoid at least some inefficiencies with respect to particular program structures.

In some embodiments, operation of the first prediction circuitry and the second prediction circuitry at least partly overlaps. The first prediction circuitry and the second prediction circuitry may operate in an at least partly overlapping manner such that they may be said to operate substantially in parallel. As a consequence of this, parallelisation of at least part of the prediction process may be achieved.

In some embodiments, operation of the first prediction circuitry and the second prediction circuitry occurs in a same clock cycle. The operation of the first prediction circuitry and the second prediction circuitry could be said to be parallelised such that they happen at the same time. In this way, the operation of performing a prediction is not significantly slowed down as a consequence of operating on both a first block of instructions and a second block of instructions. It will be appreciated that if further prediction circuits are provided, then they may also be configured to operate in the same clock cycle such that they operate substantially in parallel.

In some embodiments, the data processing apparatus comprises: fetch circuitry to fetch the first block of instructions in a first clock cycle and to fetch the second block of instructions in a second clock cycle. Fetch circuitry can be provided as part of a pipeline such that one instruction is fetched as another is de-coded while yet another instruction is executed, and so on. This can lead to a degree of Instruction Level Parallelism (ILP) so that the overall efficiency of the system can be improved. In these embodiments, the fetch circuitry is adapted to fetch the first block of instructions in one clock cycle and in another (different) clock cycle, the fetch circuitry is adapted to fetch the second block of instructions. It will be appreciated that as a consequence of this, the first block of instructions may be considered to be a first fetch block of instructions and may therefore correspond in size with the number of instructions that are fetched in a single fetch operation. Similarly for the second block of instructions.

In some embodiments, the first block of instructions and the second block of instructions are contiguous. The first block of instructions and the second block of instructions may also be continuous in the sense that there is no break between the first block of instructions and the second block of instructions. Here, the contiguousness or continuousness refers to the order in which the instructions are found when they are loaded from memory. This therefore represents a program order of the instructions rather than the order in which they are necessarily executed by an execution unit of a data processing apparatus.

In some embodiments, the prediction block is unaligned such that the prediction block overlaps at least one other prediction block comprising one of the first block of instructions and the second block of instructions. Alignment refers to where the start of each element occurs and restricts the position where the start of an element can be found. For instance, elements are aligned at 4-byte intervals, then elements can start at bytes 0, 4, 8, 12, or any multiple of four. If elements are unaligned then an element could start at any byte (space permitting) such as byte 9 or 11. This restriction applies regardless of an element's length. For instance, taking the above 4-byte alignment, it is possible to place a 2-byte element at byte 8, but it is not permitted to place a second 2-byte element at byte 10, even though it would fit, since this would violate the alignment principle. This results in "padding" which is used in order to enforce the alignment.

In these embodiments, the prediction blocks are unaligned. Furthermore, although non-alignment does not necessarily result in overlap in the sequence of blocks per se, in these embodiments, each prediction block can be made up from a unique combination of instruction blocks. An instruction block can therefore be part of, e.g. two different prediction blocks thereby resulting in overlap.

In some embodiments, the first block of instructions and the second block of instructions comprise a loop that spans the first block of instructions and the second block of instructions.

In some embodiments, the lookup circuitry has one input index port such that at most one reference to instruction blocks making up the prediction block can be used to index into the lookup circuitry. For instance, only one of the instruction blocks making up the prediction block can be used to index into the lookup circuitry. In such embodiments, the first prediction data and the second prediction data are therefore accessed at a point in the lookup circuitry that corresponds with a reference to the prediction block. Since only a single input index port is provided, circuit size and power consumption can be kept small.

In some embodiments, the reference is an address of the first block of instructions. Thus, although prediction data for the first block of instructions and the second block of instructions are both stored in the lookup circuitry, only an address of the first block of instructions is used to access both of these items of data. In other words, the prediction data for the second block of instructions is "miss-indexed" such that, rather than being at an index corresponding with the second block of instructions, it is instead found at an index corresponding with the first block of instructions. This way, references to both the first block of instructions and the second block of instructions are not needed even though prediction data for both the first block of instructions and the second block of instructions can be obtained.

In some embodiments, the first prediction data and the second prediction data are the same. In practice, the data might be valid for (e.g. intended for use in) producing either the first control flow prediction or the second control flow prediction. Thus, if there is first prediction data and second prediction data, they may "compete" for storage at the same index location of the lookup circuitry. In these embodiments, the first processing circuitry and the second processing circuitry can determine whether the prediction data is intended to be used to produce the first prediction data or the second prediction data.

In some embodiments, the first processing circuitry is adapted to provide the first control flow prediction in respect of a first control flow instruction in the first block of instructions using the first prediction data; and the second processing circuitry is adapted to provide the second control flow prediction in respect of a first control flow instruction in the second block of instructions using the second prediction data. Each of the blocks of instructions may comprise of a number of control flow instructions. The first processing circuitry could therefore be duplicated a number of times equal to the number of branch instructions that are designed to be simultaneously handled, similarly for the second processing circuitry. In these embodiments, the first processing circuitry is adapted to provide the first control flow prediction in respect of the first control flow instruction in the first block of instructions. Similarly, the second processing circuitry is adapted to provide the second control flow prediction in respect of the first control flow instruction in the second block of instructions. Thus, at least one of the control flow instructions in each of the first block of instructions and the second block of instructions can be processed.

In some embodiments, the index comprises a global history. A global history could refer to, for instance, a global branch history that represents the direction and/or target of branch instructions that have been encountered within a period of time. This technique recognises that the behaviour of a particular control flow instruction can be heavily influenced by the path or sequence of branch instructions that has been taken up until that point. Consequently, by considering the global history as part of the index, different predictions for a particular control flow instruction can be provided depending on how that particular control flow instruction has been reached.

In some embodiments, the lookup circuitry operates as part of a TAGE predictor. A TAGE predictor considers the global history when making branch predictions. TAGE prediction uses geometrically increasing lengths of global history as a basis for making predictions. For example, in such embodiments, the lookup circuitry may provide a number of different tables. The index used for each table is made up from bits of the global history and a reference to the prediction block. The reference to the prediction block remains the same, but the number of bits of the global history that are used will differ for each table. This makes it possible for different amounts of global history to be considered, which therefore permits variable granularity to be used to express the different predictions that can come about as a consequence of variable changes in the global history. For instance, a very course-grained view of the global history could be used in order to represent a very large number of possible values of the global history for one prediction whilst simultaneously another very specific, very finely grained view of global history may be used to provide a different prediction for a very specific edge case. In other embodiments, other forms of prediction may be used. For instance, in some embodiments, perceptron prediction may be used instead.

In some embodiments, the data processing apparatus comprises: first base prediction circuitry to provide a first base prediction in respect of the first block of instructions; and second base prediction circuitry to provide a second base prediction in respect of the second block of instructions, wherein the first base prediction is replaced by the first control flow prediction; and the second base prediction is replaced by the second control flow prediction. Base prediction circuitry provides an initial prediction. Such circuitry may be simple so as to be energy efficient and/or fast and/or small. In such embodiments, the base prediction can be used where no other prediction is provided by the first processing circuitry or the second processing circuitry. In other words, the first base prediction can be provided and then replaced by the first control flow prediction if one is produced by the first processing circuitry. Similarly, the second base prediction can be provided and then replaced by the second control flow prediction if the second control flow prediction is provided. This therefore removes the need for prediction data to be stored in the lookup circuitry for all predictions. Instead, the base prediction circuitry can be used in order to provide base prediction data, and the prediction data can therefore be used in order to represent exceptional or unusual circumstances.

In some embodiments, the data processing apparatus comprises bimodal prediction circuitry. In bimodal prediction circuitry, the previous outcomes of a control flow instruction (such as a branch instruction) is tracked and used as the basis of the prediction of future behaviour of that control flow instruction. For instance, if a particular branch instruction is repeatedly not taken then this will influence a bimodal predictor to continue to predict the outcome of that branch instruction as "not taken". If, in due course, the branch starts to be taken, then the confidence of the prediction will drop and if the branch continues to be taken, then the prediction will flip so that the bimodal predictor starts to predict that the branch will be "taken" in the future. There are a number of ways in which bimodal predictors can be implemented. However, in some embodiments, bimodal predictors use a saturated counter with the extremes of the counter representing high confidence predictions "taken" and "not taken". The branch instruction being taken causes the counter to move in the direction of the high confidence "taken" outcome and the branch instruction not being taken causes the counter to move in the direction of the high confidence "not taken" outcome. Once at these extremes, further confirmatory behaviour of the branch instruction does not further influence the counter. Consequently, regardless of the number of times that a branch instruction has been taken, it is a limited number of steps away from the prediction being changed.

Particular embodiments will now be described with reference to the figures.

Figure 1:
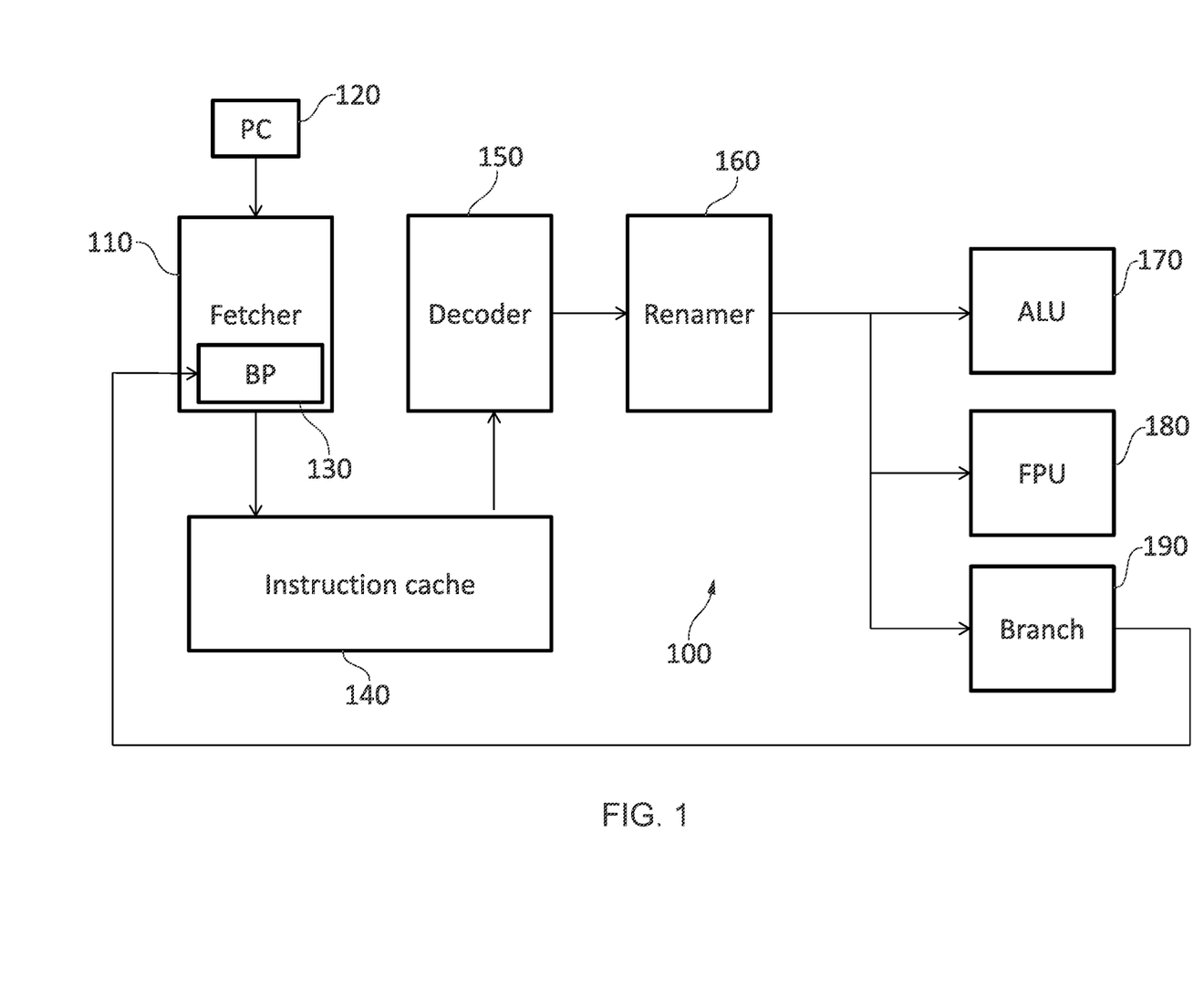
FIG. 1 schematically illustrates a pipeline.

FIG. 1 illustrates an example of a pipeline 100. Within the pipeline 100 a fetcher 110 fetches instructions that are to be executed from a main memory or a cache and stores them into an instruction cache 140. A program counter 120 is used to indicate the address of the instruction that is to be fetched.

Having fetched the instructions into the instruction cache 140, a decoder 150 is provided to decode the instructions and produce one or more control signals. These are passed to a renamer 160 that renames registers such that instructions can be executed out of order without causing errors in coherency. The control signals as modified by the renamer 160 are passed to one or more execution units including an Arithmetic Logic Unit (ALU) 170, Floating Point Unit (FPU) 180, and branch execution unit 190. It will be appreciated that other execution units or duplicates of the execution units mentioned here could also be provided.

Although this pipeline only has a small number of stages, it illustrates the general process by which an instruction is fetched from memory, decoded, renamed and finally executed. Other pipelines may include more stages than these four stages. A benefit of the pipeline 100 is that it is able to provide Instruction Level Parallelism (ILP). In particular, while one instruction is being fetched, another can be decoded, another can be renamed and one or more can be executed by the execution units 170, 180, 190.

During this process, the control flow of the program may change. For instance, the program may follow a branch instruction (such as a conditional branch instruction) that causes the instruction fetching process to proceed non-linearly, e.g. for the address of the instructions being fetched to suddenly jump. However, until a branch instruction is actually executed, it is not known whether a particular control flow instruction will be taken or not taken. Rather than stalling execution until the branch instruction can be evaluated, a branch predictor 130 is provided in order to predict the behaviour of these control flow instructions when they are encountered and before they are evaluated. Consequently, instructions can continue to be fetched, decoded, renamed, and executed based on the prediction. If the branch predictor is correct, there is no delay experienced as a consequence of encountering the branch predictor. If the branch predictor is wrong then a "rewind" must take place, but generally the process will be no worse off than if it had stalled until the branch had been resolved. Thus, on average, the presence of the branch predictor improved the efficiency of the system.

During execution of a control flow instruction by the branch execution unit 190, it may be necessary to update the data used by the branch predictor 130 in order to make more accurate branch predictions. Accordingly, the branch execution unit 190, on executing a branch, can provide feedback to the branch predictor 130 in order to improve the quality of predictions that are made in the future.

Figure 2:
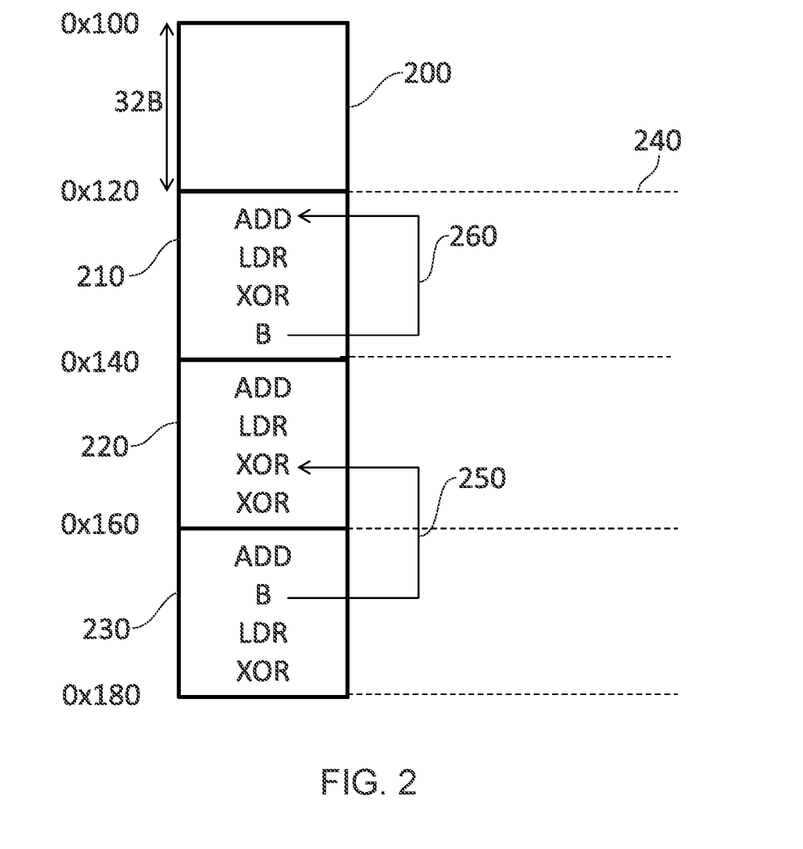
FIG. 2 illustrates how loops can stretch across blocks of instructions.

FIG. 2 illustrates an example of a computer program. The program is fetched from memory or from a cache in instruction blocks 200, 210, 220, 230. In this example, each instruction block is of 32 bytes and contains four instructions. Accordingly, in this example, each instruction occupies eight bytes. It will be appreciated that in this example, the instructions are aligned to the instruction blocks. That is, regardless of the number of bytes used to express each instruction, each instruction begins every four bytes (starting from byte 0 in this example). Similarly, the instruction blocks are also aligned. In other words, each instruction block begins every 32 bytes (again starting from 0 in this example). In this example, branch prediction is performed on each instruction block 200, 210, 220, 230. It is therefore possible for a block of instructions to be fetched and for that block to have branch prediction performed on it.

Each instruction block 200, 210, 220, 230 defines a boundary 240. Although instructions and instruction blocks cannot cross the boundaries 240, it is possible for a loop to cross such a boundary. For instance, in the example of FIG. 2, it is shown that a loop 250 bridges two instruction blocks 220, 230. In other words, the series of instructions that are repeatedly executed from a branch instruction to a target of the branch instruction crosses over the boundary 240 between the first instruction block 220 and the second instruction block 230. The spanning of a loop 250 across multiple instruction blocks 220, 230 in this way can cause inefficiency problems for previously proposed branch predictors. This is because two instruction blocks 220, 230 are analysed by the branch predictor at each iteration of the loop 250. For instance, when the second block 230 is analysed it is determined that the branch will be taken, causing a jump to the first block of instructions 220. The first block of instructions 220 is then analysed and it is determined that there is no branch prediction to be made. Then the second branch of instructions 230 be analysed and a branch prediction can be made in respect of the loop. Accordingly, even though the loop only comprises one instruction block's worth of instructions (4), those instructions cannot be treated as a single instruction block due to alignment restrictions. Instead, two blocks of instructions 220, 230 are analysed to make a prediction for the branch instruction in the second instruction block 230. Note that this problem might not be solved by simply having larger instruction blocks. Although it could be less likely that a loop would span two larger instruction blocks, the prediction circuitry would be larger in order to handle the possibility of multiple branch instructions occurring within a single block of instructions. Hence, when such a program structure occurs, it is liable to lead to even greater inefficiencies.

FIG. 2 also illustrates a further block of instructions 210 that comprises four instructions that make up a second loop 260. Here, the instructions that make up the loop 260 are exactly contained within a block of instructions 210 and so only that block of instructions 210 needs to be analysed in order for the outcome of the branch instruction in the loop 260 to be assessed.

Figure 3:
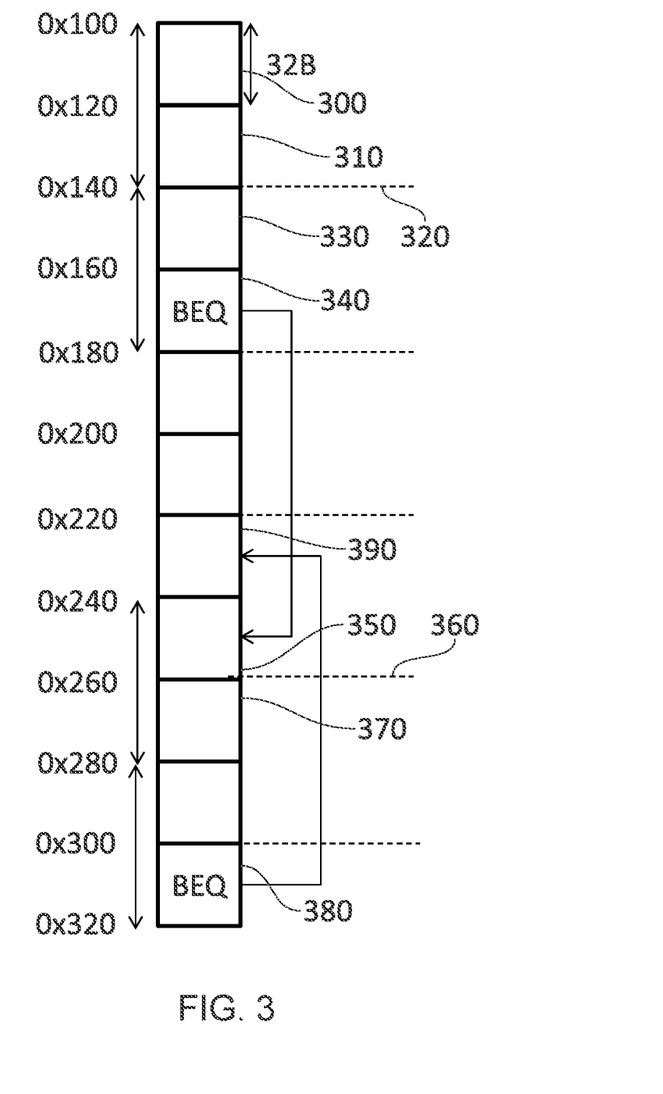
FIG. 3 shows the concept of prediction blocks in accordance with some embodiments.

FIG. 3 illustrates how blocks of instructions are handled in the present technique. In this example, again, blocks of instructions of 32 bytes are fetched by an instruction fetcher 110 and are passed to a branch predictor 130. Again, there is no need for there to be a correspondence between the size of an instruction block and a prediction block. In this embodiment, pairs of instruction blocks 300, 310 collectively form a prediction block, which is considered by the branch predictor 130. The branch predictor 130 therefore performs analysis on two blocks of 32 bytes (64 bytes in total). However, the prediction blocks are not aligned and may overlap as will be demonstrated below.

In this example, when the first instruction block 330 and the second instruction block 340 are passed to the branch predictor 130, the branch predictor 130 predicts that the branch in the second instruction block 340 will cause the program to jump to a third instruction block 350 as illustrated with the arrowed line in FIG. 3. In a next processor cycle, a new prediction block is passed to the branch predictor 130, made up from the third instruction block 350 (which contains the target of the branch instruction in the second block 340) together with the instruction block 370 following that. Note that this new prediction block is not aligned with the previous prediction block. FIG. 3 illustrates the original boundaries 320, 360, which occur every 64 bytes. The initial prediction block 330, 340 lies between these boundaries 320, 360 while the new prediction block 350, 370 straddles a boundary 360.

This can lead to a situation in which different prediction blocks overlap each other. For instance, the next prediction block will cause a branch. When the following prediction block is passed to the branch predictor 130, this following prediction block will contain a first block of instructions 390 that is a target of the branch and a second block of instructions 350 that follows the target. It will therefore be seen that the new prediction block 390, 350 overlaps with the previous prediction block 350, 370 by virtue of a common instruction block 350. Phrased differently, a first instruction block of a prediction block could be the second instruction block of a different prediction block. Furthermore, a second instruction block of one prediction block could be the first instruction block of a different prediction block.

In this example, each of the instruction blocks making up a prediction block are contiguous (e.g. continuous). Consequently, even if a first instruction block in a prediction block causes a branch, the second instruction block of that prediction block will still be the instruction block following the first instruction block in program order rather than the target of the branch. In other embodiments, the instruction blocks making up a prediction block are non-contiguous.

Figure 4:
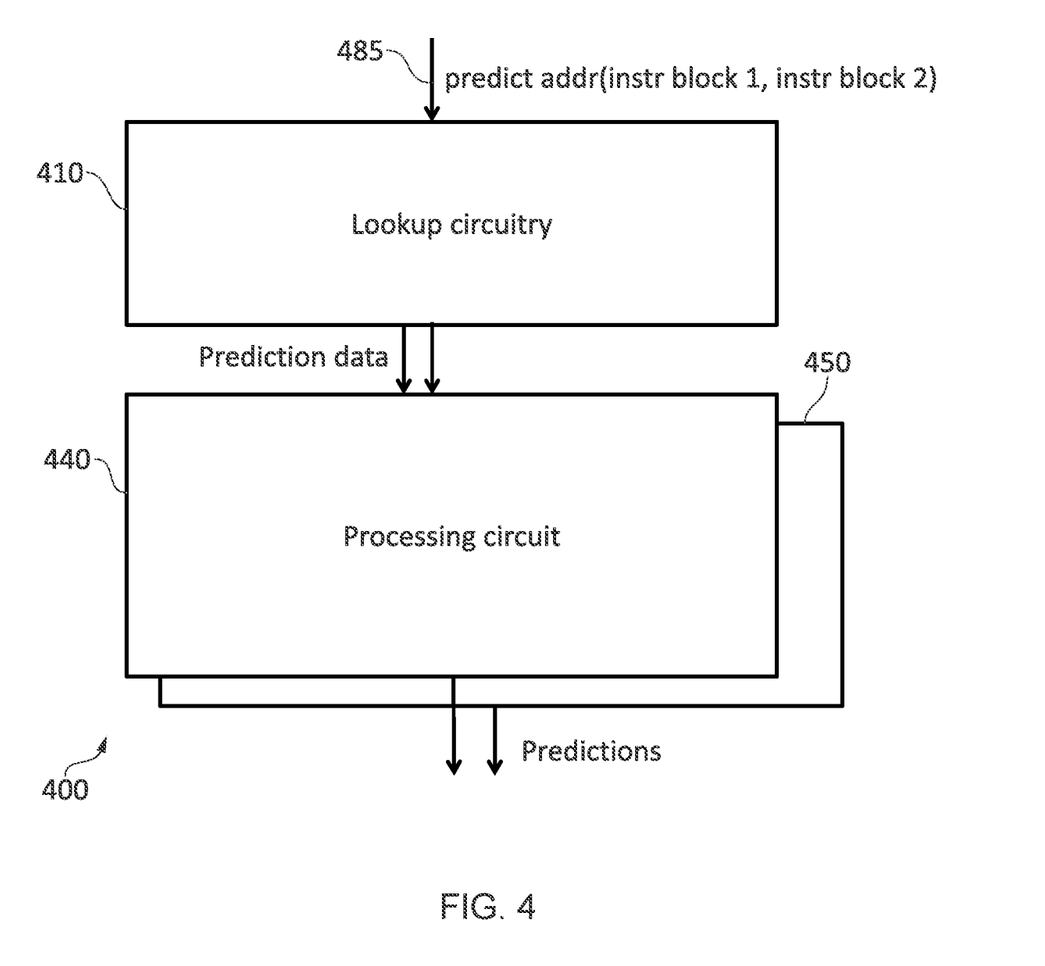
FIG. 4 schematically illustrates an apparatus in accordance with some embodiments.

FIG. 4 illustrates an apparatus 400 in accordance with some embodiments. The apparatus 400 includes a single input index port 485 into which a prediction address, which is a reference to a prediction block made up from two instruction blocks (instr block 1 and instr block 2). is received. The reference to the prediction block is, in this example, a reference to the first instruction block making up the prediction block. Since only a single input index port 485 is provided, it is not possible for references to all of the instruction blocks making up the prediction block to be provided. However, the hardware is simplified as a consequence of not needing to provide multiple input index ports. The prediction address is used as an index by lookup circuitry 410 to obtain prediction data. In other words, in this example, separate lookups are not performed on both instr block 1 and instr block 2. The resulting prediction data is passed to a pair of processing circuits 440, 450. Each processing circuit 440, 450 handles one control flow instruction in one of the instruction blocks making up the prediction block and outputs a prediction in respect of that control flow instruction.

The skilled person will appreciate that fewer than two predictions may be output if, for instance, only one of the instruction blocks contains a control flow instruction.

In this way, it is possible for predictions to be made on multiple instruction blocks simultaneously without having to multiply up the input index ports to receive references to multiple instruction blocks at the same time, and without having to duplicate the lookup circuitry (which tends to be large) to allow multiple simultaneous lookups in relation to multiple instruction blocks. Furthermore, problems with alignment, which are exacerbated by having large prediction blocks, are limited by allowing the prediction blocks to be unaligned and overlap.

Figure 5:
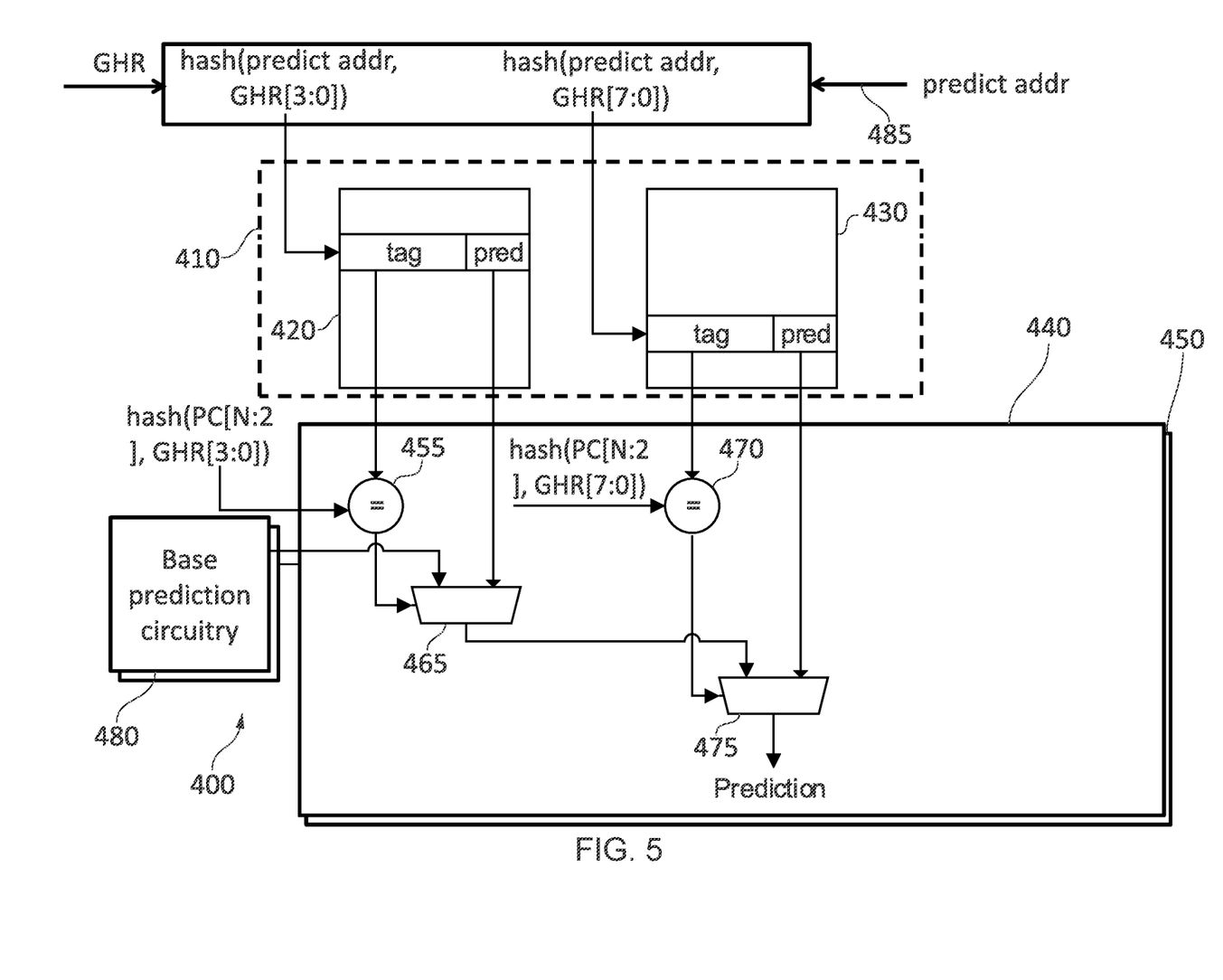
FIG. 5 schematically illustrates an apparatus in accordance with some embodiments.

FIG. 5 shows, in accordance with some examples of the present technique, an example of an apparatus 400 which performs TAGE prediction. The apparatus 400 includes lookup circuitry 410, which in this example comprises a number of lookup tables 420, 430. Each of the tables 420, 430 is still indexed using the prediction address (as opposed to addresses of instruction blocks making up the prediction address) and contains tagged predictions. However, the index used for each of the tables 420, 430 differs slightly. In particular, each index is made up by hashing the prediction address and a subset of bits from a Global History Register (GHR). Since different indexes are used for each of the lookup tables 420, 430, different predictions are output depending on the amount of the global history that is taken from the global history register. This allows for a dynamic granularity to be applied regarding the amount of global history that is used to form branch predictions.

The lookup circuitry 410 outputs prediction data from the tables 420, 430 to processing circuits 440, 450. Again, one processing circuit 440, 450 is provided for each branch instruction for which simultaneous prediction can occur within the prediction block and each processing circuit 440, 450 receives the same prediction data from the tables 420, 430 of the lookup circuitry 410. The prediction data is made up from a plurality of tagged predictions (one per table 420, 430). The prediction is a predicted direction that a particular branch instruction will take and the tag indicates the particular branch instruction to which the prediction relates.

Each processing circuit 440, 450 compares each tagged prediction to see if the tag corresponds with the branch instruction being processed by that processing circuit 440, 450. Since a hash is used for the index into the tables 420, 430, it is possible that a single index could relate to multiple different branch instructions. Comparison circuitry 455, 470 in the processing circuits 440, 450 is therefore provided to compare the tag with the branch instruction being processed by a processing circuit 440, 450.

The predictions from the tables 420, 430 are cascaded. In this way, the prediction from a table 430 that relies on the longest length of global history is taken in preference to a table that relies on less global history 420. Thus a more specific prediction overrides a more general prediction. This is achieved using a number of cascading multiplexes 465, 475, the final output for which is the final prediction for the processing circuitry 440, 450. Base prediction circuitry 480 is provided in order to provide a first initial prediction. This can be implemented using bimodal prediction circuitry, which can in turn be implemented using a saturated counter. Consequently, an even more general case than the first table 420 that uses no global history can be provided. Indeed, it may be expected that the prediction produced by the base prediction circuitry 480 may be accurate in, for example, 80% of cases. Consequently, for the majority of cases, no specific entry needs to be provided in the lookup circuitry 410. Only in situations where the base prediction circuitry 480 produces an incorrect prediction does an entry need to be inserted into the lookup circuitry 410 for a particular branch instruction.

In this example, the base prediction circuitry 480 is replicated for each processing circuit since the base prediction circuitry 480 can be implemented using a small amount of circuitry.

Figure 6:
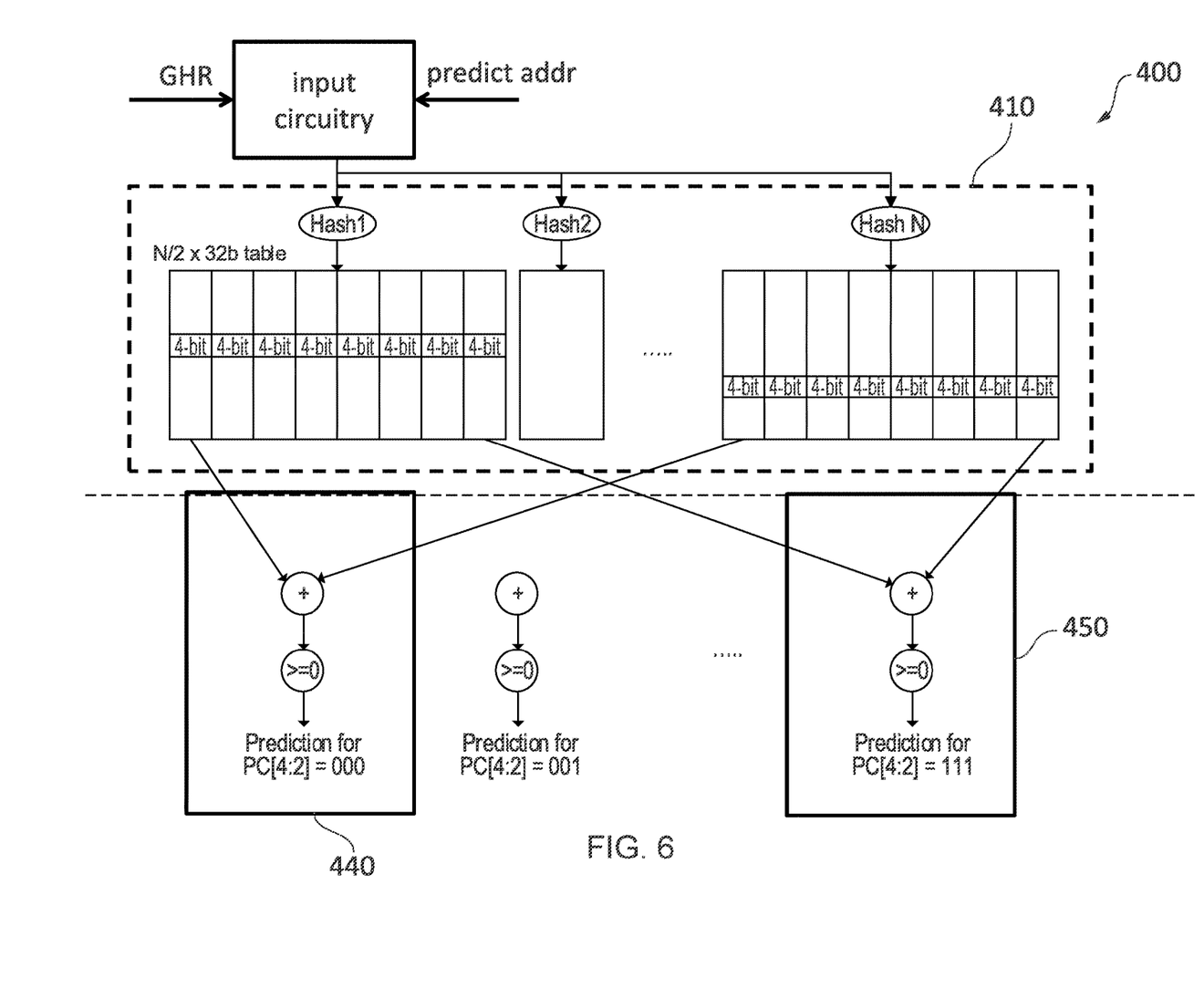
FIG. 6 schematically illustrates an apparatus in accordance with some embodiments.

FIG. 6 illustrates, in accordance with some embodiments, an example of the present technique being applied to a perceptron branch predictor 400. In the perceptron predictor, a number of tables are provided. Similarly to the TAGE predictor, each table relates to a different amount of global history being considered. In the perceptron predictor, however, each table is then split into a number of columns, with each column relating to a different value for the least significant bits of the program counter at which a control flow instruction is stored. FIG. 6 therefore shows that if the least significant three bits of the program counter of a branch instruction is 000 then the first hash is used to index into a first column of a first table, and an N'th hash is used as an index into a first column of an N'th table.

Each processing circuit 440, 450 receives, as prediction data, a number of different outputs from the tables of the lookup circuitry 410. These outputs are added together and compared to zero in order to produce the prediction (for instance, negative numbers could represent "not taken" while positive numbers represent "taken"). Again, processing circuitry 440 is duplicated for each branch instruction of each prediction block that is intended to be predicted for simultaneously. However, in this example, the prediction data provided from the lookup circuitry 410 is different for a first processing circuit 440 than it is for a second processing circuit 450, since the inputs to each processing circuit depend on the column being indexed for each of the tables.

Accordingly, in the examples of FIGS. 4, 5, and 6, it can be seen how a single reference can produce predictions for multiple blocks of instructions at the same time. Since multiple blocks of instructions are handled, rather than a single large block, it is possible to provide flexibility with respect to the alignment of those blocks. By increasing such flexibility, it is possible to better handle certain program structures, such as loops that span multiple instruction blocks. As shown with respect to FIG. 3, this can therefore help to improve efficiency of the system. Although the processing circuitry 440, 450 is duplicated, this is generally significantly smaller than the size of the lookup circuitry 410.

It will be appreciated that as a consequence of using the same or similar index in the lookup circuitry 410 for multiple instruction blocks, there could be a small increase in the number of collisions in the lookup circuitry 410. In particular, since more entries may be stored at the same index, it could be more likely that multiple entries may be desired to be stored at the same index. This is reduced somewhat by the duplication of the base prediction circuitry 480, which is expected to be small. Since, in the majority of cases, the base prediction circuitry 480 is sufficient to provide a prediction for a given branch instruction, it is less likely that specific data will have to be stored in the lookup circuitry 410. Further reductions to such collision can be provided, in the case of TAGE prediction, by increasing the number of tables 420, 430 that are provided in the lookup circuitry 410. This increases the number of opportunities that exist for storing data relating to a specific branch instruction.

Figure 7:
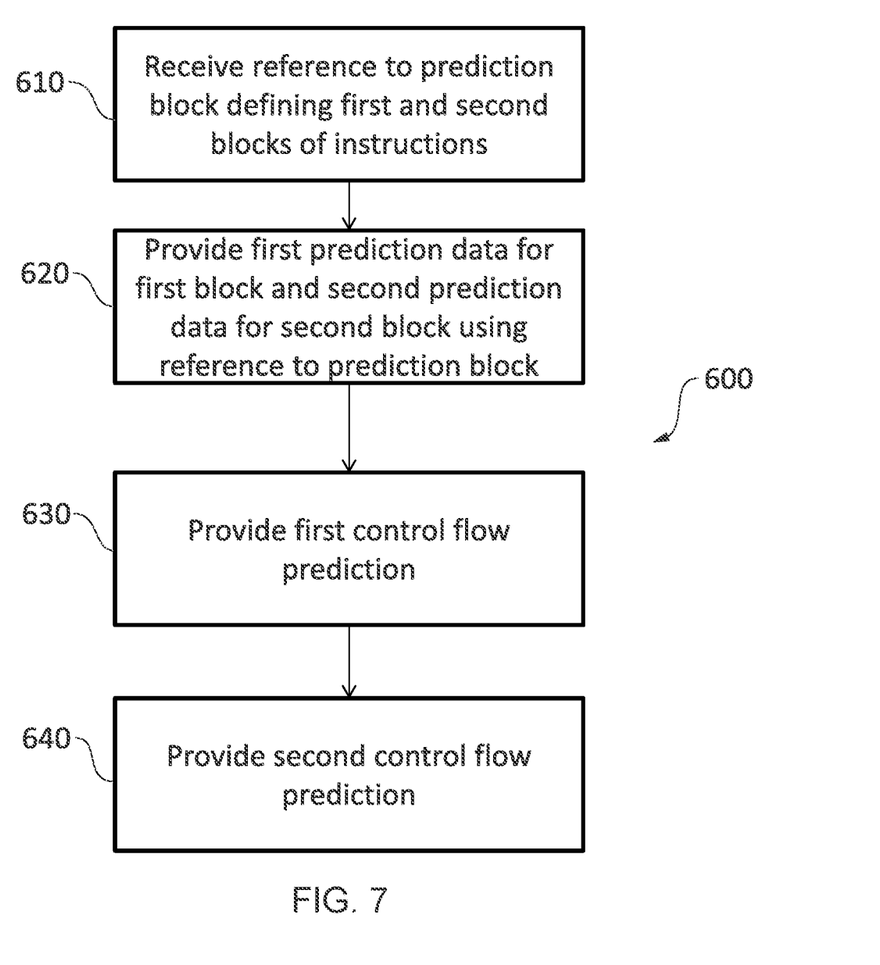
FIG. 7 shows a flowchart that illustrates a method in accordance with some embodiments.

FIG. 7 illustrates a flow chart 600 that shows a method of data processing according to some embodiments. At a step 610, a reference to a prediction block made up from a first block of instructions and a second block of instructions is received. At a step 620, first prediction data and second prediction data are provided. These can be provided by lookup circuitry 410, for instance. The lookup circuitry 410 uses a reference to the prediction block in order to provide the first and second prediction data. At a step 630, a first control prediction is provided. This can be provided by, for example, first processing circuitry 440. The first control flow prediction is provided by providing the first prediction data obtained in step 620. Then, at step 640, second control flow prediction is provided. This can be provided via, for instance, second processing circuitry 450 as a consequence of providing the second prediction data obtained during step 620.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   lookup circuitry to provide first prediction data in respect of a first block of instructions, which is fetched from instruction storage via a first block address and second prediction data in respect of a second block of instructions, which is fetched from the instruction storage via a second block address, different from the first block address;
   first processing circuitry to provide a first control flow prediction in respect of the first block of instructions using the first prediction data; and
   second processing circuitry, different from the first processing circuitry, to provide a second control flow prediction in respect of the second block of instructions using the second prediction data, wherein
   the first block of instructions and the second block of instructions collectively define a prediction block;
   the lookup circuitry uses a reference to the prediction block as at least part of an index to both the first prediction data and the second prediction data; and
   the reference to the prediction block uses one of the first block address and the second block address without using the other of the first block address and the second block address.

2. A data processing apparatus according to claim 1, wherein
   operation of the first processing circuitry and the second processing circuitry occurs in a same clock cycle.

3. A data processing apparatus according to claim 1, comprising:
   fetch circuitry to fetch the first block of instructions in a first clock cycle and to fetch the second block of instructions in a second clock cycle.

4. A data processing apparatus according to claim 1, wherein
   the first block of instructions and the second block of instructions are contiguous.

5. A data processing apparatus according to claim 1, wherein
   the prediction block is unaligned such that the prediction block overlaps at least one other prediction block comprising one of the first block of instructions and the second block of instructions.

6. A data processing apparatus according to claim 1, wherein
   the first block of instructions and the second block of instructions comprise a loop that spans the first block of instructions and the second block of instructions.

7. A data processing apparatus according to claim 1, wherein
   the lookup circuitry has one input index port such that at most one reference to instruction blocks making up the prediction block can be used to index into the lookup circuitry.

8. A data processing apparatus according to claim 1, wherein
   the reference is an address of the first block of instructions.

9. A data processing apparatus according to claim 1, wherein
   the first prediction data and the second prediction data are the same.

10. A data processing apparatus according to claim 1, wherein
    the first processing circuitry is adapted to provide the first control flow prediction in respect of a first control flow instruction in the first block of instructions using the first prediction data; and
    the second processing circuitry is adapted to provide the second control flow prediction in respect of a first control flow instruction in the second block of instructions using the second prediction data.

11. A data processing apparatus according to claim 1, wherein
    the index comprises a global history.

12. A data processing apparatus according to claim 1, wherein
    the lookup circuitry operates as part of a TAGE predictor.

13. A data processing apparatus according to claim 1, comprising:
    first base processing circuitry to provide a first base prediction in respect of the first block of instructions; and
    second base processing circuitry to provide a second base prediction in respect of the second block of instructions, wherein
    the first base prediction is replaced by the first control flow prediction; and
    the second base prediction is replaced by the second control flow prediction.

14. A data processing apparatus according to claim 13, wherein
the first base processing circuitry and the second base processing circuitry comprise bimodal prediction circuitry.

15. A data processing apparatus according to claim 1, wherein operation of the first processing circuitry and the second processing circuitry at least partly overlaps.

16. A method comprising:
providing first prediction data in respect of a first block of instructions, which is fetched from instruction storage via a first block address and second prediction data in respect of a second block of instructions, which is fetched from the instruction storage via a second block address, different from the first block address;
providing, via a first processing circuitry, a first control flow prediction in respect of the first block of instructions using the first prediction data; and
providing, via a second processing circuitry different from the first processing circuitry, a second control flow prediction in respect of the second block of instructions using the second prediction data, wherein
the first block of instructions and the second block of instructions collectively define a prediction block;
a reference to the prediction block is used as at least part of an index to both the first prediction data and the second prediction data; and
the reference to the prediction block uses one of the first block address and the second block address without using the other of the first block address and the second block address.

* * * * *